United States Patent Office 2,714,747
Patented Aug. 9, 1955

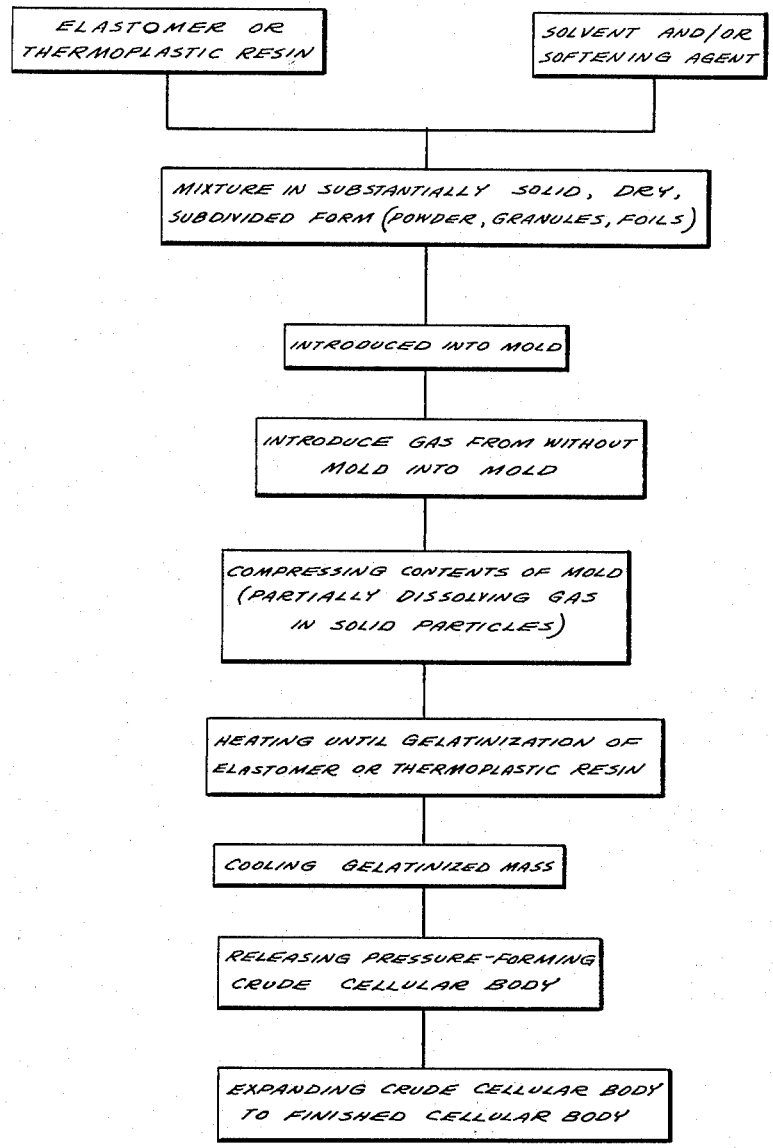

2,714,747

MANUFACTURE OF CELLULAR BODIES

Herbert Lindemann, Sins, and Ernst Stirnemann, Basel, Switzerland

Application July 12, 1950, Serial No. 173,485

Claims priority, application Switzerland July 27, 1949

23 Claims. (Cl. 18—48)

This invention is concerned with improvements in or relating to the manufacture of cellular bodies having closed cells from elastomers, such as natural and artificial rubber, and thermoplastic synthetic materials and the like.

Various methods have been suggested for the manufacture of cellular bodies with closed cells. These methods can be classified substantially in one of two groups.

The first group includes methods according to which the inflation of the starting material is effected by the expansion of gases which are produced by the decomposition of blowing agents or gas liberating materials inside the mass, being dissolved in it. The second group comprises methods according to which the gases are forced from outside into the heated mass and after cooling are caused to expand with cell formation. The methods of the first group have the disadvantage that blowing agents are required that are not only expensive but in addition often are toxic and leave behind undesirable foreign components in the mass; moreover, high temperatures are required in their employment for the decomposition of the blowing agents.

The methods of the second group, too, from which the present invention starts still have so far certain shortcomings, namely, it is necessary to compress the gases by means of compressors to a very high pressure of over 100 up about 500 atmospheres and then to react them with the mass in an autoclave with appropriately thick walls. The materials, such as rubber mixtures, more especially plastic substances, have so far generally been used in the form of pastes or plates. In this state they have only a limited power of absorbing gases. Consequently, the depth to which the gases penetrate and the velocity with which they dissolve in the mass are small. Even rubber, which has better power of absorption for gases than synthetic resins, requires in actual practice about 2 hours for the incorporation of the gas if the material is used in thin sheets and up to 24 hours if used in thicker sheets. It is thus possible either to produce comparatively thin cellular bodies or, if it is desired to produce thicker cellular bodies of lower specific gravity without too much loss of time, bodies with an irregular structure which have, for example, large non-inflated portions internally.

It is the purpose of the present invention to obviate in the methods of the second group the disadvantages mentioned by special working conditions and to produce in a short time cellular bodies with the desired specific gravity and with a very uniform cell structure.

According to the invention a mould with a movable ram is used. In addition the invention solves the problem by the combination of three measures, which are new in themselves and consist in: (a) before being introduced into the mould the starting material is reduced to a finely divided loose, compressible state in the form of crumbs, granules, powders or thin foils and is at the same time mixed with solvents or softening agents which cause or improve solution of the gas in the mass even at normal temperature under high gas pressure: (b) To this finely divided, loose mass in the mould is added from outside the gas to be incorporated in it under pressure which is preferably much lower than that which would be required to effect the solution of the gas in the heated mass: (c) The mass, if required after heating, is compressed together with the gas in the mould to at least the gas pressure required for the solution of the gas in the mass by means of the ram whereby solution of the gas and compression of the mass is achieved.

The mass so treated is then subjected to the further, temperature and expansion conditions, known per se, required for the formation of the cellular bodies, this further treatment consisting in heating the mould until gelatinisation and homogenisation of the mass occurs, cooling the mould with the mass, releasing the pressure and expanding the moulded mass by heating with formation of the cellular body.

The measure under (a) increases considerably the solubility and the speed of absorption of the mass for the gas which depend on the surfaces exposed to the gas and on the solvent, and at the same time considerable compression of the mass according to (c) is facilitated.

By applying the measures under (b) and (c) both the high external gas pressure and a high-pressure autoclave can be dispensed with and replaced by the less expensive mould. The high pressure required to dissolve the gas is generated in the mould. By using a mould it is possible, in contradistinction to an autoclave, to produce from the start cellular bodies of a definite shape.

As explained above, the use of a finely divided, loose starting material which contains solvents and softening agents is of considerable importance in the performance of the present invention. It is important to use only such additions to the substances mentioned as further the solution of the gases in the mass and have a certain minimum dissolving and swelling power for the starting material. Non-solvents are unsuitable for the present process; if such are used the synthetic material separates during working up as a compact mass. The solvents and softening agents may be used either separately or as a mixture.

The nature and the composition of the mixtures are always so selected as to give best results in the manufacturing process and according to the finished product required.

For the manufacture of hard cellular bodies synthetic substances that are hard in themselves are mixed with solvents and/or softening agents of a relatively low boiling point which can be removed again from the finished cellular bodies. For the manufacture of soft cellular bodies solvent and/or softening agents of a high boiling point are utilised that are not volatile and remain inside the cellular body. The volatile solvents and softening agents may be added to the mass before, during or after its conversion into the finely dispersed, loose form prescribed by the present invention.

At any rate the solvents and softening agents, which are added must make the absorption of gas possible or even further it. The solubility for gases of the solvents and softening agents varies. Non-volatile solvents and softening agents are often poor solvents for gases. When they are used it is, therefore necessary to add to the masses such substances which produce good dissolving power for gases in the masses. These agents are generally liquids and part of them may evaporate during the working up; a certain portion of them, however, must remain in the mass in order to increase the gas absorption power of the latter.

The solvents and softening agents are selected according to the starting material employed. For synthetic substances, such as polyvinyl chloride, they are agents which produce a good power of dissolving gases, such for example as acetone, ethyl-methyl ketone, butyl acetate, cyclohexanone, for rubber it may be, for example, benzol.

The starting materials used for the present process may be thermoplastic, non-vulcanizable synthetic substances, such for example as polyvinyl chloride, polystyrol and other polymers, also cellulose acetate and the like, furthermore elastomers, such as natural and synthetic rubbers. The substances according to the present invention must be in a finely divided, loose state and must have an addition of solvents and softening agents which further the dissolving power for gases.

The conversion of the starting materials into the finely divided, loose state can be effected in various ways and depends on the nature of the substances. Thermoplastic synthetic substances may be used in the non-plasticised or the plasticised state. In the former case the substances are converted by means of solvents, and/or softening agents and various more suitable operations such as stirring, heating or the like into the form of a loose, dry, crumbly-granular mass. Low-boiling solvents are absorbed by the synthetic substances if the correct quantity is used and thus produce directly dry, swollen granules. If, however, higher-boiling solvents are employed and stirred as usual then—more especially if larger quantities of such solvents are used—wet paste-like masses are often obtained which should not be used for the purposes of the present process. If however, these mixtures are worked up in conjunction with volatile solvents, then their conversion into a granular form is possible. The mass is not plasticised. This loose mass offers no mechanical resistance to the gas pressure and has a maximum surface area which is most conducive for the solution of the gas. Alternatively it is possible to reduce the compact starting material consisting of a thermoplastic synthetic resin in a mill to obtain crumbly to powdery particles, and at the same time to spray it with solvents, softening or swelling agents.

In certain cases, however, it is advantageous first to plasticise or gelatinise the mass and then to reduce it. This method offers the advantage that the mixture is thereby homogenised so that when the mass is compressed under high pressure in the mould no separation can occur as it often does occur with non-plasticised mixtures. In addition, it is easy to reduce the plasticised masses into a finely divided and homogeneous state of division, whereas in simply mixing the synthetic substances with solvents and softening agents it is often necessary, according to the nature of the components used, to employ a certain skill or technique if it is desired to obtain uniform powders.

Plasticising may be carried out in any desired manner, for example by heating to higher temperatures, by compression with the application of pressure and heat or by working up on rollers. Plastic masses in various shapes, such as plates, skins, sheets, rods, etc. are obtained. The reduction in size of the thus obtained plasticised mass may likewise be carried out in a variety of ways. Thus, it is possible first to break up the individual pieces, plates, etc. and then to grind them in a mill or other suitable apparatus to powders.

Instead of producing the plasticised mass first, it is possible to start from scraps of already-plasticised synthetic substances as obtained in the production and working up of such substances.

At any rate, all of these working up methods produce more or less finely divided and more or less soft, pulverulent particles which lie loosely on top of one another, readily absorb the treating gas and are very easily worked up.

The plasticised mass can also be rolled into thin foils of, for example, 0.1 mm. thickness or less and then used as a starting material in the mould. For this purpose pieces conforming to the shape of the mould are cut out of the foils and loosely stacked in the mould. If desired, the plasticised masses may be drawn out in the form of threads.

As with synthetic materials it is also possible to use the foil-shape for elastomers such as rubber, the foils being manufactured in known manner and inserted into the mould where they are converted into cellular bodies.

When working up foils it is important for them to be lying on each other in the mould in a loose, compressible condition when being worked up so that the gas everywhere has access to the mass between the foils. In the case of rather hard foils, of polyvinyl chloride, this condition is automatic. If, however, the foils—for example rubber foils—have a tendency to stick together then the loose state is produced by distributing a preferably powdery substance between the foils which substance is absorbed or bound by the mass in the course of its being worked up. The powder used for this purpose with elastomers, is for example zinc stearate, for synthetic resins a synthetic resin powder preferably of the same synthetic resin as that which is contained in the starting material. In the course of the subsequent heat treatment of the foils the separating powder disappears in the heated or gelatinised mass and after cooling a completely, or practically homogeneous body is obtained.

On the other hand, it is known that elastomers are not readily reduced to powder form because the raw mass tends to stick either during or after the reducing operation so that only coarse pieces with little gas-dissolving power can be produced from it. According to the invention it is, however, possible to reduce this mass easily to the finely divided, loose, compressible state, for example to powder, by first pre-vulcanising (part-vulcanising) them and then dividing them in a mill or any other pulverising apparatus. Also with these reduced elastomers it will prove advantageous to improve their gas-dissolving power by a solvent or swelling treatment with suitable media such as benzol.

Once the masses have been converted into the desired finely divided, loose, compressible state with increased power for dissolving gases, they are introduced into the mould, treated as under ($b$) and ($c$) above so that the gas dissolves in them and then further worked up into cellular bodies in known manner.

According to the above method under ($b$) it is possible—in contradistinction to the known processes—to make do with external gas pressures of less than 100 atmospheres, for example of 10–30 atmospheres, the gas then being introduced into the mould through a suitable device, such for example as a non-return valve. If in certain cases the mould is comparatively large in relating to the material charge then it is possible to introduce the gas into the mould at atmospheric pressure without first compressing it, the pressure not being increased until the next stage of the operation ($c$) is reached. According to this stage ($c$) the gas supply is cut off and the gas pressure increased (for example by compressing the mould by means of a hydraulic press) to the value required and usual for the individual starting material used, for example 50–300 atmospheres, by introducing the ram into the mould, the mass being compressed as near as possible to the volume which it would fill in the cell as a solid, cohesive body.

During, or with advantage after, compressing, the temperature is increased so that the mass on compression by means of the ram is gelled or changes into a cohesive form. The mass then becomes homogeneous or uniformly consistent and contains the gases dissolved uniformly in all parts. The mass is then further worked up into the desired cellular bodies in known manner, for example by cooling the mould under pressure and then releasing the pressure. In this operation the body takes on the shape of the mould and is not, or only slightly, expanded. It is then removed from the mould and expanded by heating. In the case of elastomers vulcanisation is completed during or after expansion.

In the course of this operation the volatile solvents and softening agents will escape more or less rapidly from the cellular body, whilst the difficultly volatile softening agents remain in the cellular body and make it soft.

It has further been found that the formation of a regular and finer cell structure can be considerably furthered by adding to the starting materials small quantities, for example 1 to 2% by weight, of blowing agents such as azo-iso butyric acid dinitrile or diazoaminobenzene. In order to prevent the pretreatment of the synthetic resin mass affecting the blowing agent, it may be added preferably after the pretreatment together with and/or in solution with the solvent or swelling agent, for example the volatile solvent and softening agent.

*Examples*

1. 300 gr. of polyvinyl chloride are added to a volatile solvent, for example 200 gr. of tetrahydrofuran, and mixed with each other in such a manner that a loose crumbly-granular powdery mass is obtained. This mass has taken up all of the solvent without the individual small granules sticking together as a pasty slurry and has a volume weight (shaken weight) of slightly more than 500 gr. per litre. This quantity of powder is introduced into a mould capable of accommodating the whole quantity i. e. which has a capacity of about 1000 cc. The mould consists of a strong walled vessel into which a ram may be introduced. The mould must be so compressible by the ram that the whole 500 gms. introduced can be compressed completely, or almost completely to the limit. Thus, in the compressed state it will practically have a capacity of about 500 cc. Before compressing is commenced the ram must be inserted into the top part of the mould in such a manner that it tightly closes the mould. The mould is then filled in suitable manner from outside with nitrogen gas till a pressure of about 20 atmospheres is reached, the nitrogen gas introduced is retained by means of a non-return valve and by means of a hydraulic press the ram is then pushed into the mould until the gas and the material contained in the mould are sufficiently compressed. Together with the gas compressed to about 100 atmospheres the compressed material is heated in the usual manner at this pressure by heating it for about 30 minutes to about 170° C., after which the mould is cooled and opened. The gas has now almost completely been absorbed by the material. The body removed from the mould is caused to expand by re-heating whereby the desired cellular body with closed cells is obtained. While the body is being heated the solvent added to the material is removed wholly or partly from the cellular body formed by evaporation. The removal of the remaining solvent can also be effected by allowing the substance to stand at room temperature for a lengthy period of time, without heating. The finished cellular body so formed has completely closed cells, it is hard and rigid and has a specific gravity of about 0.025. It has a thickness of from 5 to 6 cm. according to the construction of the mould and its cell structure is dense and regular.

If the loose, crumbly-granular starting material is produced with a mixture containing in addition to the volatile solvent some softening agent, such for example as tricresylphosphate, then a similar, but soft and elastic cellular body is obtained.

(2) 300 parts by weight of polyvinyl chloride with 200 parts by weight of dioctyl phthalate are gelled into plates. These plates are broken up into small pieces which are ground to powder in a mill. The powder is then moistened with 100 parts by weight of tetrahydrofuran as a volatile solvent, if desired already while it is being ground in the mill. From a gelatinous, swelled mass a dry, fine powder is obtained.

Alternatively, the same starting materials are gelled and rolled into thin foils of about 0.1 mm. on rollers. The foils are then cut into pieces or punched out in shapes corresponding to the cross-section of the mould. The individual foil parts are then wetted with tetrahydrofuran and placed one on top of the other inside the mould, powdered polyvinyl chloride being sprinkled between the foils.

The mould containing the gelatinised powder or the foils is then closed in known manner, filled with gas at a gas pressure of about 10–30 atmospheres such for example as nitrogen, and pressed together against the material, until the gas pressure has become about 200 atmospheres. During or after the compressing operation there follows the heating to gelling temperature and the cooling to 70–90° C., and if required after slight pre-expansion in the mould the usual cooling to about room temperature. The product so formed is then removed from the mould and expanded with heat. By compression and heating in the mould the individual powder particles or foils respectively coalesce during gelling and after the mould has been opened form a completely uniform body, which after expansion is uniformly permeated with cells.

3. 400 gr. of rubber are part-vulcanised at about 60–80° C. in usual manner, then cooled, broken down to crumbs in a mill and in it, or after removal from it, wetted with 100 gr. of benzol. Further treatment in the mould is carried out as in Example 1, but the temperature is raised to only about 100° C. and no complete vulcanisation is carried out. The completion of the vulcanising process takes place outside the mould, after expanding at about 140° C.

We claim:

1. A process of preparing closed-cell, gas-containing cellular bodies of natural and artificial elastomers and thermoplastic resins, comprising the steps of arranging in a mold a mass composed of substantially dry particles of solid material of at least one substance selected from the group consisting of elastomers and thermoplastic resins mixed with at least one substance selected from the group consisting of solvents and softening agents which improve the gas-dissolving ability of said substance in an amount sufficient to improve said gas-dissolving ability while retaining the substantially solid, dry condition of the same; introducing a gas being substantially insoluble at atmospheric pressure in said substantially dry, solid mass from without said mold into said mold containing said mass, whereby said gas is evenly and thoroughly distributed in said substantially solid mass without being dissolved in the same; compressing the contents of said mold including the gas introduced therein until at least partial dissolution of said gas in said substantially dry, solid mass without formation of a gel; heating the contents of said mold while still compressed until gelatinization of said substance, thereby forming a homogeneous mass of said substance having said gas evenly distributed therein; and cooling the thus formed mass and releasing the pressure thereon and causing the same to expand and form a closed-cell gas-containing cellular body.

2. A process of preparing closed-cell, gas-containing cellular bodies of thermoplastic resins, comprising the steps of introducing into a mold a mixture in substantially solid, dry subdivided form of at least one plasticized thermoplastic resin with at least one substance selected from the group consisting of solvents and softening agents which improve the gas-dissolving ability of said thermoplastic resin in an amount sufficient to improve said gas-dissolving ability while retaining the substantially solid, dry condition of the same; introducing a gas being substantially insoluble at atmospheric pressure in said substantially dry, solid mixture from without said mold into said mold containing said mixture, whereby said gas is evenly and thoroughly distributed in said substantially solid mixture without being dissolved in the same; compressing the contents of said mold including the gas introduced therein until at least partial dissolution of said gas in said substantially dry, solid mixture without formation of a gel, heating the contents of said mold while still compressed until gelatinization of said thermoplastic resin, thereby forming a homogeneous mass of said substance having said gas evenly distributed therein; and cooling the thus formed mass and releasing the pressure thereon and causing the same to expand and form a closed-cell gas-containing cellular body.

3. A process of preparing closed-cell, gas-containing cellular bodies of thermoplastic resins, comprising the steps of introducing into a mold a mixture in substantially solid, dry subdivided form of polyvinyl chloride with at least one substance selected from the group consisting of solvents and softening agents which improve the gas-dissolving ability of said polyvinyl chloride in an amount sufficient to improve said gas-dissolving ability while retaining the substantially solid, dry condition of the same; introducing a gas being substantially insoluble at atmospheric pressure in said substantially dry, solid mixture from without said mold into said mold containing said mixture, whereby said gas is evenly and thoroughly distributed in said substantially solid mixture without being dissolved in the same; compressing the contents of said mold including the gas introduced therein until at least partial dissolution of said gas in said substantially dry, solid mixture without formation of a gel; heating the contents of said mold while still compressed until gellatinization of said polyvinyl chloride, thereby forming a homogeneous mass of said substance having said gas evenly distributed therein; and cooling the thus formed mass and releasing the pressure thereon and causing the same to expand and form a closed-cell gas-containing cellular body.

4. A process of preparing closed-cell, gas-containing cellular bodies of natural and artificial elastomers and thermoplastic resins, comprising the steps of introducing into a mold a mixture in substantially solid, dry powdered form of at least one substance selected from the group consisting of elastomers and thermoplastic resins with at least one substance selected from the group consisting of solvents and softening agents which improve the gas-dissolving ability of said substance in an amount sufficient to improve said gas-dissolving ability while retaining the substantially solid, dry condition of the same; introducing a gas being substantially insoluble at atmospheric pressure in said substantially dry, powdered mixture from without said mold into said mold containing said mixture, whereby said gas is evenly and thoroughly distributed in said substantially powdered mixture without being dissolved in the same; compressing the contents of said mold including the gas introduced therein until at least partial dissolution of said gas in said substantially dry, powdered mixture without formation of a gel; heating the contents of said mold while still compressed until gelatinization of said substance selected, thereby forming a homogeneous mass of said substance having said gas evenly distributed therein; and cooling the thus formed mass and releasing the pressure thereon and causing the same to expand and form a closed-cell gas-containing cellular body.

5. A process according to claim 4 in which said substance selected from the group consisting of elastomers and thermoplastic resins is polyvinylchloride.

6. A process of preparing closed-cell, gas-containing cellular bodies of natural and artificial elastomers and thermoplastic resins, comprising the steps of introducing into a mold a mixture in substantially solid, dry granular form of at least one substance selected from the group consisting of elastomers and thermoplastic resins with at least one substance selected from the group consisting of solvents and softening agents which improve the gas-dissolving ability of said substance in an amount sufficient to improve said gas-dissolving ability while retaining the substantially solid, dry condition of the same; introducing a gas being substantially insoluble at atmospheric pressure in said substantially dry, granular mixture from without said mold into said mold containing said mixture, whereby said gas is evenly and thoroughly distributed in said substantially granular mixture without being dissolved in the same; compressing the contents of said mold including the gas introduced therein until at least partial dissolution of said gas in said substantially dry, granular mixture without formation of a gel; heating the contents of said mold while still compressed until gelatinization of said substance, thereby forming a homogeneous mass of said substance having said gas evenly distributed therein; and cooling the thus formed mass and releasing the pressure thereon and causing the same to expand and form a closed-cell gas-containing cellular body.

7. A process according to claim 6 in which said substance selected from the group consisting of elastomers and thermoplastic resins is polyvinylchloride.

8. A process of preparing closed-cell, gas-containing cellular bodies of natural and artificial elastomers and thermoplastic resins, comprising the steps of introducing into a mold a mixture in the form of substantially dry foils of at least one substance selected from the group consisting of elastomers and thermoplastic resins with at least one substance selected from the group consisting of solvents and softening agents which improve the gas-dissolving ability of said substance selected from the group consisting of elastomers and thermoplastic resins in an amount sufficient to improve said gas-dissolving ability while retaining the substantially solid, dry condition of the same and having a powder which prevents adherence to each other of the foils of said substance distributed about said foils, said powder being absorbable by said substance when heated; introducing a gas being substantially insoluble at atmospheric pressure in said substantially dry, solid mixture from without said mold into said mold containing said mixture, whereby said gas is evenly and thoroughly distributed in said substantially solid mixture without being dissolved in the same; compressing the contents of said mold including the gas introduced therein until at least partial dissolution of said gas in said substantially dry, solid mixture without formation of a gel; heating the contents of said mold while still compressed until gelatinization of said substance, thereby forming a homogeneous mass of said substance having said gas evenly distributed therein; and cooling the thus formed mass and releasing the pressure thereon and causing the same to expand and form a closed-cell gas-containing cellular body.

9. A process according to claim 8 in which said substance selected from the group consisting of elastomers and thermoplastic resins is polyvinylchloride.

10. A process of preparing closed-cell, gas-containing cellular bodies of natural and artificial elastomers and thermoplastic resins, comprising the steps of introducing into a mold a mixture in substantially solid, dry subdivided form of at least one substance selected from the group consisting of elastomers and thermoplastic resins with at least one substance selected from the group consisting of solvents and softening agents which improve the gas-dissolving ability of said substance in an amount sufficient to improve said gas-dissolving ability while retaining the substantially solid, dry condition of the same; introducing at a pressure of about 10–30 atmospheres a gas being substantially insoluble at atmospheric pressure in said substantially dry, solid mixture from without said mold into said mold containing said mixture, whereby said gas is evenly and thoroughly distributed in said substantially solid mixture without being dissolved in the same; compressing the contents of said mold including the gas introduced therein until at least partial dissolution of said gas in said substantially dry, solid mixture without formation of a gel; heating the contents of said mold while still compressed until gelatinization of said substance, thereby forming a homogeneous mass of said substance having said gas evenly distributed therein; and cooling the thus formed mass and releasing the pressure thereon and causing the same to expand and form a closed-cell gas-containing cellular body.

11. A process according to claim 10 in which said substance selected from the group consisting of elastomers and thermoplastic resins is polyvinylchloride.

12. A process of preparing closed-cell, gas-containing cellular bodies of natural and artifical elastomers and thermoplastic resins, comprising the steps of introducing into a mold a mixture in substantially solid, dry subdivided form of at least one substance selected from the group consisting of elastomers and thermoplastic resins with at least one substance selected from the group consisting of solvents and softening agents which improve the gas-dissolving ability of said substance in an amount sufficient to improve said gas-dissolving ability while retaining the substantially solid, dry condition of the same and having admixed therewith about 1–2% of a blowing agent; introducing a gas being substanaially insoluble at atmospheric pressure in said substantially dry, solid mixture from without said mold into said mold containing said mixture, whereby said gas is evenly and thoroughly distributed in said substantially solid mixture without being dissolved in the same; compressing the contents of said mold including the gas introduced therein until at least partial dissolution of said gas in said substantially dry, solid mixture without formation of a gel; heating the contents of said mold while still compressed until gelatinization of said substance and decomposition of said blowing agent into gaseous products, thereby forming a homogeneous mass of said substance having said gas evenly distributed therein; and cooling the thus formed mass and releasing the pressure thereon and causing the same to expand and form a closed-cell gas-containing cellular body.

13. A process according to claim 12 in which said substance selected from the group consisting of elastomers and thermoplastic resins is polyvinylchloride.

14. A process of preparing closed-cell, gas-containing cellular bodies of natural and artificial elastomers and thermoplastic resins, comprising the steps of introducing into a mold a mixture in substantially solid, dry subdivided form of at least one substance selected from the group consisting of elastomers and thermoplastic resins with at least one substance selected from the group consisting of solvents and softening agents which impdove the gas-dissolving ability of said substance in an amount sufficient to improve said gas-dissolving ability while retaining the substantially solid, dry condition of the same; introducing a gas being substantially insolube at atmospheric pressure in said substantially dry, solid mixture from without said mold into said mold containing said mixture, whereby said gas is evenly and thoroughly distributed in said substantially solid mixture without being dissolved in the same; compressing the contents of said mold including the gas introduced therein while heating to a temperature below the gelatinization temperature of said substance until at least partial dissolution of said gas in said substantially dry, solid mixture without formation of a gel; heating the contents of said mold while still compressed until gelatinization of said substance thereby forming a homogeneous mass of said substance having said gas evenly distributed therein; and cooling the thus formed mass and releasing the pressure thereon and causing the same to expand and form a closed-cell gas-containing cellular body.

15. A process according to claim 14 in which said substance selected from the group consisting of elastomers and thermoplastic resin is polyvinylchloride.

16. A process of preparing closed-cell, gas-containing cellular bodies of natural and artificial elastomers and thermoplastic resins, comprising the steps of introducing into a mold a mixture in substantially solid, dry subdivided form of at least one substance selected from the group consisting of elastomers and thermoplastic resins with at least one substance selected from the group consisting of solvents and softening agents which improve the gas-dissolving ability of said substance in an amount sufficient to improve said gas-dissolving ability while retaining the substantially solid, dry condition of the same; introducing nitrogen gas being substantially insoluble at atmospheric pressure in said substantially dry, solid mixture from without said mold into said mold containing said mixture, whereby said nitrogen gas is evenly and thoroughly distributed in said substantially solid mixture without being dissolved in the same; compressing the contents of said mold including the nitrogen gas introduced therein until at least partial dissolution of said nitrogen gas in said substantially dry, solid mixture without formation of a gel; heating the contents of said mold while still compressed until gelatinization of said substance, thereby forming a homogeneous mass of said substance having said nitrogen gas evenly distributed therein; and cooling the thus formed mass and releasing the pressure thereon and causing the same to expand and form a closed-cell gas-containing cellular body.

17. A process according to claim 16 in which said substance selected from the group consisting of elastomers and thermoplastic resins is polyvinylchloride.

18. A process of preparing closed-cell, gas-containing cellular bodies of thermoplastic resins, comprising the steps of introducing into a mold a mixture in substantially solid, dry subdivided form of at least one plasticized thermoplastic resin with at least one substance selected from the group consisting of solvents and softening agents which improve the gas-dissolving ability of said thermoplastic resin in an amount sufficient to improve said gas-dissolving ability while retaining the substantially solid, dry condition of the same; introducing nitrogen gas being substantially insoluble at atmospheric pressure in said substantially dry, solid mixture from without said mold into said mold containing said mixture, whereby said nitrogen gas is evenly and thoroughly distributed in said substantially solid mixture without being dissolved in the same; compressing the contents of said mold including the nitrogen gas introduced therein until at least partial dissolution of said nitrogen gas in said substantially dry, solid mixture without formation of a gel; heating the contents of said mold while still compressed until gelatinization of said thermoplastic resin, thereby forming a homogeneous mass of said substance having said nitrogen gas evenly distributed therein; and cooling the thus formed mass and releasing the pressure thereon and causing the same to expand and form a closed-cell gas-containing cellular body.

19. A process of preparing closed-cell gas-containing cellular bodies of natural and artificial elastomers and thermoplastic resins, comprising the steps of introducing into an open mold a mass composed of particles of solid material selected from the group consisting of elastomers and thermoplastic resins and at least one substance selected from the group consisting of plasticizers and solvents therefor, said mass being loosely packed and having a large surface area defining passages through said mass causing the surface of the same to be accessible to surrounding atmosphere; closing said mold; mechanically compressing said mass so as to substantially decrease the volume thereof while retaining passages through said mass; introducing a gas which is substantially insoluble in said mass at atmospheric pressure from without said mold into said mold, thereby increasing the gas pressure in said mold and distributing said gas through said mass and the elevated pressure causing partial dissolution of said gas in said solid material of said mass; heating the contents of said mold while still compressed until gelatinization of said material, thereby forming a homogeneous mass of said material having said gas evenly distributed therein; and cooling the thus formed mass and releasing the pressure thereon, thereby causing the same to expand and form a closed-cell gas-containing cellular body.

20. A process of preparing closed-cell, gas-containing cellular bodies of natural and artificial elastomers and thermoplastic resins, comprising the steps of forming a gelatinized body of at least one theremoplastic resin and at least one substance selected from the group consisting of plasticizers and solvents therefor; subdividing the thus formed thermoplastic resin body into relatively small solid particles of the same so as to greatly increase the surface area thereof; introducing a mass of said solid particles of thermoplastic resin into an open mold, said mass being loosely packed and having a large surface area defining passages through said mass causing the surfaces of the same to be accessible to surrounding atmosphere; closing said mold; mechanically compressing said mass so as to substantially decrease the volume thereof while retaining passages through said mass; introducing a gas which is substantially insoluble in said mass at atmospheric pressure from without said mold into said mold, thereby increasing the gas pressure in said mold and distributing said gas through said mass and the elevated pressure causing partial dissolution of said gas in said solid material of said mass; heating the contents of said mold while still compressed until gelatinization of said material, thereby forming a homogeneous mass of said material having said gas evenly distributed therein; and cooling the thus formed mass and releasing the pressure thereon, thereby causing the same to expand and form a closed-cell gas-containing cellular body.

21. A process of preparing closed-cell, gas-containing cellular bodies of natural and artificial elastomers and thermoplastic resins, comprising the steps of mixing finely divided particles of a thermoplastic resin with at least one substance selected from the group consisting of solvents and plasticizers therefor in an amount sufficient to increase the gas-absorbing property of said thermoplastic resin but not sufficient to cause gelatinization of the same upon compression at room temperature; introducing a mass of said finely divided particles of thermoplastic resin into an open mold, said mass being loosely packed and having a large surface area defining passages through said mass causing the surface of the same to be accessible to surrounding atmosphere; closing said mold; mechanically compressing said mass so as to substantially decrease the volume thereof while retaining passages through said mass; introducing a gas which is substantially insoluble in said mass at atmospheric pressure from without said mold into said mold, thereby increasing the gas pressure in said mold and distributing said gas through said mass and the elevated pressure causing partial dissolution of said gas in said solid material of said mass; heating the contents of said mold while still compressed until gelatinization of said material, thereby forming a homogeneous mass of said material having said gas evenly distributed therein; and cooling the thus formed mass and releasing the pressure thereon, thereby causing the same to expand and form a closed-cell gas-containing cellular body.

22. A process of preparing closed-cell, gas-containing cellular bodies of natural and artificial elastomers and thermoplastic resins, comprising the steps of spraying only finely divided particles of a thermoplastic resin while agitating the same at least one substance selected from the group consisting of solvents and plasticizers therefor in an amount sufficient to increase the gas-absorbing property of said thermoplastic resin but not sufficient to cause gelatinization of the same upon compression at room temperature; introducing a mass of said finely divided particles of thermoplastic resin into an open mold, said mass being loosely packed and having a large surface area defining passages through said mass causing the surface of the same to be accessible to surrounding atmosphere; closing said mold; mechanically compressing said mass so as to substantially decrease the volume thereof while retaining passages through said mass; introducing a gas which is substantially insoluble in said mass at atmospheric pressure from without said mold into said mold, thereby increasing the gas pressure in said mold and distributing said gas through said mass and the elevated pressure causing partial dissolution of said gas in said solid material of said mass; heating the contents of said mold while still compressed until gelatinization of said material, thereby forming a homogeneous mass of said material having said gas evenly distributed therein; and cooling the thus formed mass and releasing the pressure thereon, thereby causing the same to expand and form a closed-cell gas-containing cellular body.

23. A process according to claim 1 in which each of said particles of solid material consists of said substance selected from the group consisting of elastomers and thermoplastic resins, and each of said particles contains at least one substance selected from the group consisting of solvents and softening agents.

References Cited in the file of this patent

UNITED STATES PATENTS

| | | |
|---|---|---|
| 2,371,868 | Berg et al. | Mar. 20, 1945 |
| 2,372,695 | Taylor | Apr. 3, 1945 |
| 2,409,910 | Stober | Oct. 22, 1946 |
| 2,420,815 | Cooper | May 20, 1947 |
| 2,450,436 | McIntire | Oct. 5, 1948 |
| 2,524,039 | Carpentier | Oct. 3, 1950 |
| 2,576,749 | Carpentier | Nov. 27, 1951 |
| 2,577,743 | DeLong | Dec. 11, 1951 |